(12) United States Patent
Li et al.

(10) Patent No.: US 12,191,679 B2
(45) Date of Patent: Jan. 7, 2025

(54) WIRELESS CHARGING METHOD AND SYSTEM

(71) Applicant: Delta Electronics (Shanghai) Co., Ltd., Shanghai (CN)

(72) Inventors: Bin Li, Shanghai (CN); Nan Ye, Shanghai (CN); Jianhong Zeng, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 739 days.

(21) Appl. No.: 17/443,765

(22) Filed: Jul. 27, 2021

(65) Prior Publication Data

US 2022/0045555 A1 Feb. 10, 2022

(30) Foreign Application Priority Data

Aug. 10, 2020 (CN) .......................... 202010796080.1

(51) Int. Cl.
*H02J 50/60* (2016.01)
*H02J 7/00* (2006.01)
*H02J 50/80* (2016.01)

(52) U.S. Cl.
CPC .......... *H02J 50/60* (2016.02); *H02J 7/00309* (2020.01); *H02J 7/007194* (2020.01); *H02J 7/0013* (2013.01); *H02J 50/80* (2016.02)

(58) Field of Classification Search
CPC ...... H02J 50/60; H02J 50/80; H02J 7/007194; H02J 7/00309
USPC ........................................................ 320/108
See application file for complete search history.

(56) References Cited

U.S. PATENT DOCUMENTS

| | | | |
|---|---|---|---|
| 2012/0242285 A1 | 9/2012 | Jung et al. | |
| 2014/0266036 A1 | 9/2014 | Jung et al. | |
| 2014/0327393 A1* | 11/2014 | Lee ......................... | H02J 50/12 320/108 |
| 2015/0326061 A1* | 11/2015 | Davison .................. | H02J 50/80 320/108 |
| 2015/0372531 A1* | 12/2015 | Tanabe .................... | H02J 50/20 320/108 |

FOREIGN PATENT DOCUMENTS

| | | |
|---|---|---|
| CN | 204131143 U | 1/2015 |
| CN | 205407343 U | 7/2016 |
| CN | 108923121 A | 11/2018 |

(Continued)

*Primary Examiner* — Nathaniel R Pelton
(74) *Attorney, Agent, or Firm* — KIRTON McCONKIE; Evan R. Witt (57) ABSTRACT

A wireless charging method includes: (a) providing a charging device, wherein the charging device includes at least one charging region for a smart device to place thereon, the charging device is configured to charge the smart device when executing a charging task, the charging task includes at least one charging subtask, and the charging device is configured to detect whether there is a detection object on the charging region when executing a detection task, and the detection task includes a plurality of detection subtasks; (b) executing a charging initialization program and a communication initialization program; and (c) executing the plurality of detection subtasks and at least one charging subtask, wherein the at least one charging subtask is interspersed and executed among the plurality of detection subtasks.

18 Claims, 7 Drawing Sheets

(56) References Cited

FOREIGN PATENT DOCUMENTS

| | | |
|---|---|---|
| CN | 109842218 A | 6/2019 |
| CN | 110673944 A | 1/2020 |
| CN | 110880803 A | 3/2020 |
| CN | 110957770 A | 4/2020 |
| CN | 111190590 A | 5/2020 |
| CN | 111245047 A | 6/2020 |
| DE | 102017223799 A1 | 6/2019 |
| EP | 3528364 A1 | 2/2018 |

* cited by examiner

WIRELESS CHARGING METHOD AND SYSTEM

CROSS-REFERENCE TO RELATED APPLICATION

This application claims priority to China Patent Application No. 202010796080.1, filed on Aug. 10, 2020, the entire contents of which are incorporated herein by reference for all purposes.

FIELD OF THE INVENTION

The present disclosure relates to a wireless charging method and system, and more particularly to a wireless charging method and system with detection function.

BACKGROUND OF THE INVENTION

The existing wireless charging device detects the device placed thereon to confirm whether there are foreign objects before or during the power transmission. In addition, during the normal charging process, the existing wireless charging device must keep checking whether the foreign object or over-temperature situation exists for ensuring the charging safety. Moreover, it is also necessary to process the charging safety confirmation with the device placed on the wireless charging device frequently, so as to confirm whether to continue charging or adjust the charging power. Since the functions of the existing wireless charging devices are relatively simple, the software architecture performs foreign object detection (FOD), over-temperature detection, and wireless charging transmitter (WCT) in turn to achieve complete functions.

With the development of the market, wireless charging technology has been rapidly developed. The demand for charging power is rapidly increased, and the fast charging technology is applied in more and more applications. The future development direction will be towards intelligent and multi-load development. For example, except for wireless charging function, the wireless charging device can also be used as a wireless communication interface for mobile devices such as cars and mobile phones. For example, the wireless charging device can charge multiple devices simultaneously. When the wireless charging device charges the device placed thereon, the wireless charging device cannot confirm whether the device placed thereon can be charged, so it is necessary to perform a wireless detection on the device at the same time. However, the time required to perform a complete wireless detection is much longer than the cycle time of the above charging safety confirmation procedure. Therefore, when the time taken for the wireless detection has exceeded the cycle time of the charging safety confirmation, the wireless charging device will automatically shut down and restart to continue wireless charging because the charging safety confirmation is not completed or the communication is interrupted for too long. Therefore, the wireless charging is intermittent and the charging quality cannot be ensured. However, if the charging safety confirmation is executed in priority when reaching the time to perform wireless detection, the complete wireless detection cannot be performed in real time. Further, if the device placed on the wireless charging device cannot be charged, which is not detected in real time, the device will be damaged due to being charged constantly.

Therefore, there is a need of providing a wireless charging method and system to obviate the drawbacks encountered from the prior arts.

SUMMARY OF THE INVENTION

It is an object of the present disclosure to provide a wireless charging method and system, the wireless detection task of the charging device is split into multiple wireless detection subtasks, and the wireless charging task is interspersed among the multiple wireless detection subtasks. Thus, the wireless charging and wireless detection are both taken into account to ensure the quality of wireless charging, and the detection object is detected in real time to prevent the detection object from being damaged.

In accordance with an aspect of the present disclosure, there is provided a wireless charging method. The wireless charging method includes steps of: (a) providing a charging device, wherein the charging device includes at least one charging region for a smart device to be placed thereon, the charging device is configured to charge the smart device when executing a charging task, the charging task includes at least one charging subtask, and the charging device is configured to detect whether there is a detection object on the charging region when executing a detection task, and the detection task includes a plurality of detection subtasks; (b) executing charging initialization program and communication initialization program; and (c) executing the plurality of detection subtasks and at least one charging subtask, wherein the at least one charging subtask is interspersed and executed among the plurality of detection subtasks.

In accordance with an aspect of the present disclosure, there is provided a wireless charging system. The wireless charging system includes a charging device, and the charging device includes at least one charging region for a smart device to be placed thereon. The charging device is configured to charge the smart device when executing a charging task. The charging task includes at least one charging subtask, and the charging device is configured to detect whether there is a detection object on the charging region when executing a detection task. The detection task includes a plurality of detection subtasks. The at least one charging subtask is interspersed and executed among the plurality of detection subtasks.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
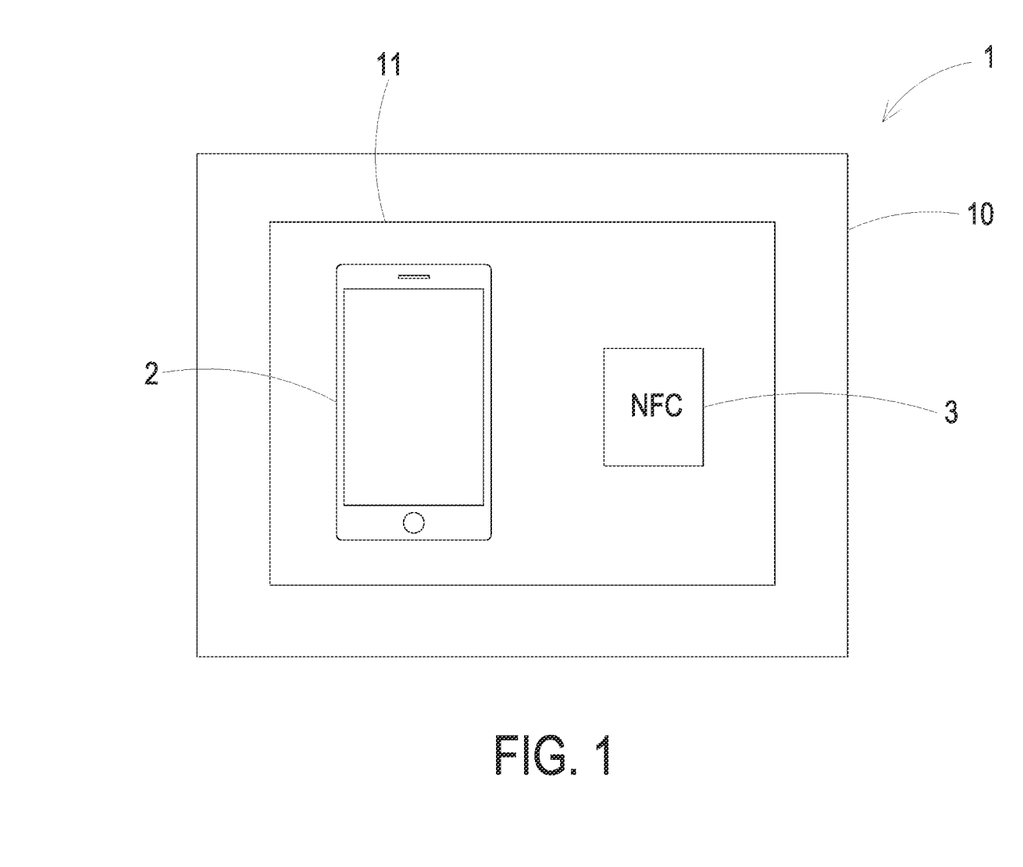
FIG. 1 is a schematic diagram illustrating position relations of a wireless charging system according to an embodiment of the present disclosure.

FIG. 1 is a schematic diagram illustrating position relations of a wireless charging system according to an embodiment of the present disclosure. As shown in FIG. 1, the wireless charging system 1 includes a charging device 10, and the charging device 10 has at least one charging region 11 for a smart device 2 to be placed thereon. The charging device 10 is configured to charge the smart device 2 when executing a charging task. The charging task includes at least one charging subtask. In an embodiment, the charging subtask includes at least one of the communication protocol task, the charging power calibration task and the charging power output task. The charging device 10 is configured to detect whether there is a detection object 3 on the charging region 11 when executing a detection task. The detection task includes a plurality of detection subtasks, and the at least one charging subtask is interspersed and executed among the plurality of detection subtasks. The smart device 2 is for example but not limited to a smartphone. The detection object 3 is for example but not limited to a NFC (Near Field Communication) card or any object having a common communication transmission protocol for the charging device 10 to execute the detection task thereon. Further, by dividing the detection task into the plurality of detection subtasks and interspersing the charging subtask among the plurality of detection subtasks, the wireless charging and wireless detection are realized simultaneously. Therefore, the situation that the time taken to execute the complete wireless detection exceeds the cycle time of the charging safety confirmation, which causes the wireless charging device to restart constantly and incapable of executing wireless charging continuously, is avoided. Moreover, because the detection task is executed in real time completely, the detection object is prevented from being damaged.

Wherein, the smart device 2 and the detection object 3 in FIG. 1 are placed at exemplary positions, and the present disclosure is not limited thereto. The smart device 2 can be placed various positions on the charging region 11. The smart device 2 only needs to be placed within the range of charging region 11 so as to charge the smart device 2. Similarly, the NFC detection needs to perform on the entire range of the charging region 11 rather than the positions shown in FIG. 1. When the charging region 11 has sufficient space, plurality of smart devices 2 or detection objects 3 can be placed at the same time, and the actual number of the smart devices 2 and detection objections 3 placed on the charging region 11 is not limited. In addition, although only one charging region 11 is shown in FIG. 1, in some embodiments, one or more smart devices 2 can be placed on the charging region 11, and the charging tasks and detection tasks are performed on all the smart devices 2 respectively and simultaneously.

Figure 2:
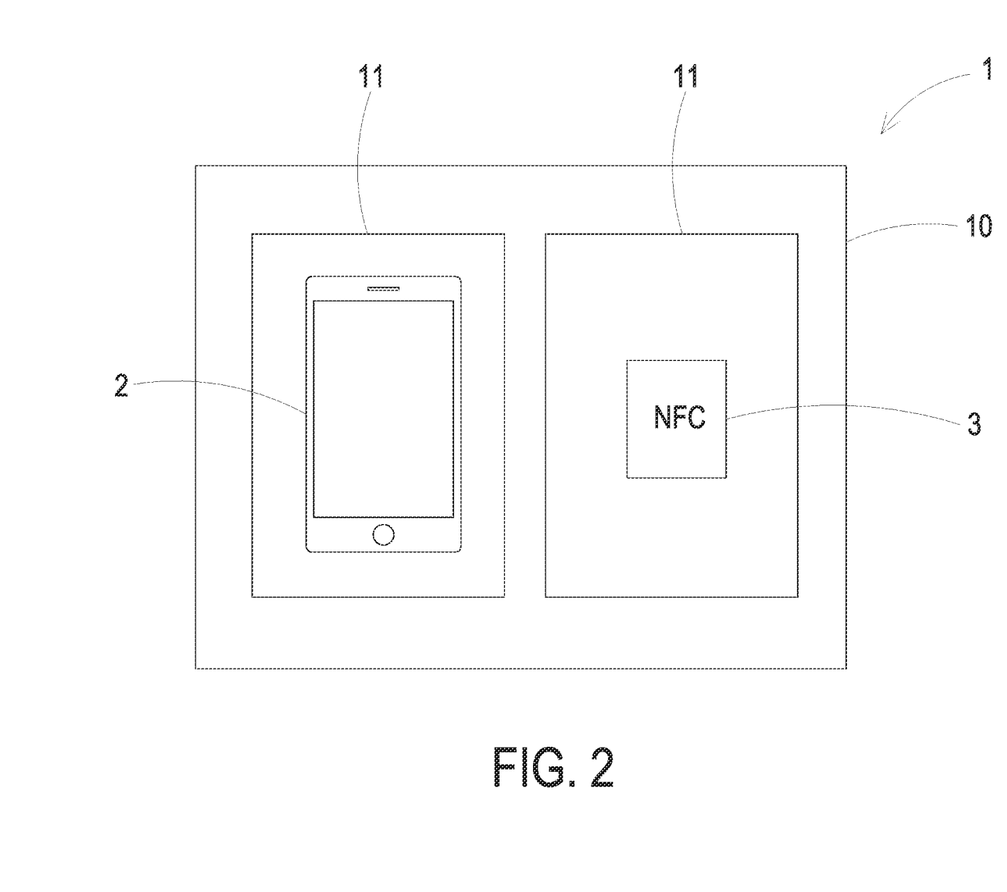
FIG. 2 is a schematic diagram illustrating position relations of a wireless charging system according to another embodiment of the present disclosure.

Referring to FIG. 2, FIG. 2 is a schematic diagram illustrating position relations of a wireless charging system according to another embodiment of the present disclosure. The elements corresponding to those of FIG. 1 are designated by identical numeral references, and the detailed descriptions thereof are omitted herein. In an embodiment, the charging device 10 has two charging regions 11, the two charging regions 11 are configured for the smart device 2 and the detection object 3 to be placed thereon respectively, or configured for two smart devices 2 to be placed thereon respectively. The number of charging regions 11 is not limited to one or two shown in above embodiments. The number of charging regions 11 can be more than two, multiple smart devices 2 and detection objects 3 are placed thereon, and the charging tasks and the detection tasks are performed on the multiple smart devices 2 and detection objects 3 respectively and simultaneously. In an embodiment, when the charging region 11 has sufficient space, plurality of smart devices 2 or detection objects 3 can be placed at the same time, and the actual number of the smart devices 2 and detection objections 3 placed on the charging region 11 is not limited.

In an embodiment, the wireless charging system 1 needs to satisfy the Qi wireless charging protocol.

In an embodiment, the detection task further includes the communication transmission between the charging device 10 and the detection object 3. For example, a wireless communication chip (such as NFC chip) is built in the charging device 10 so as to communicate with the detection object 3 (such as mobile NFC) to realize the identity authentication, task assignment and other functions. For example, after the authorized mobile phone is recognized, the function of the car key is given to the mobile phone to realize functions such as keyless engine start.

The cycle time of the charging subtask is a charging detection cycle, and the time for the charging device 10 to execute one detection subtask is a subtask time. The subtask time is set to be less than the charging detection cycle so as to avoid the time for executing the detection subtask exceeds the cycle time of the charging subtask. By setting the subtask time of each detection subtask to be less than the charging detection cycle, it is ensured that the time interval between the execution of adjacent charging subtasks is short, thereby ensuring the uninterrupted charging subtasks in the macroscopic view, and the continuity of the wireless charging process is ensured as well.

In an embodiment, the charging subtask is interspersed and executed among the plurality of detection subtasks, and the charging subtask is executed through interrupting the detection subtask. The interruption time is set to be less than the charging detection cycle. In the embodiment, for example, the charging device 10 executes the detection task in the main program. When the interruption occurs, the charging device 10 suspends the execution of the detection task and executes the charging subtask. After the charging subtask is completed, the charging device 10 returns to the main program and continues to execute the detection task from the previously interrupted progress, and waits for the arrival of the next interruption. The above operations of the charging device 10 are repeated. Thereby, another detection subtask is executed after the charging subtask is completed, and this operation is repeated again and again, thereby the execution of the charging task is ensured by interrupting the detection task. Similarly, by setting the cycle of the interruption time to be less than the charging detection cycle, that is, the execution time of the detection subtask is less than the charging detection cycle, it is ensured that the time interval between the executions of adjacent charging subtasks is short. Thereby, the uninterrupted charging subtasks in the macroscopic view are ensured, and the continuity of the wireless charging process is ensured.

In an embodiment, in the operating system of the wireless charging system 1, the charging device 10 sets the priority of the charging task to be higher than that of the detection task, that is, the charging device 10 executes the charging subtask in priority. After the charging subtask is completed, the operating system will release the control right of the charging task, and the operation system dominates to start executing the detection task at the same time. There is a counting time after the charging subtask is completed, and the detection subtask is executed before the counting time reaches the charging detection cycle. The counting time needs to be less than or equal to the charging detection cycle. For example, when the execution time of the detection subtask reaches the charging detection cycle, the operating system automatically switches the control right of the CPU to the charging task, and releases the control right to the detection task again after completing a charging subtask.

In an embodiment, the charging device 10 is further configured to detect whether there is a foreign object (not shown) on the charging region 11 when executing a foreign object detection procedure, so as to prevent the foreign object from affecting the charging device 10 to execute a charging task or a detection task. Foreign object is a non-charging object that can absorb radio waves and convert them into heat or otherwise consume energy. For example, the foreign object is a ferrous metal like coin. The charging device 10 is also configured to detect the temperature of the charging device 10 when executing a temperature detection procedure, so as to prevent the wireless charging system 1 from operating abnormally due to the excessively high temperature of the charging device 10. Further, in an embodiment, the foreign object detection procedure and the temperature detection procedure include a plurality of foreign object detection subtasks and a plurality of temperature detection subtasks, respectively, and the charging subtask is interspersed and executed among the plurality of foreign object detection subtasks and the plurality of temperature detection subtasks. Thereby, it is avoided that the charging task is interrupted when the foreign object detection procedure or the temperature detection procedure is executed. The implementation scheme of interspersing the charging subtask in plurality of foreign object detection subtasks and plurality of temperature detection subtasks can be the same as the implementation scheme of interspersing the charging subtask in plurality of detection subtasks. For example, it can be realized by interrupting or setting priority.

Figure 3:
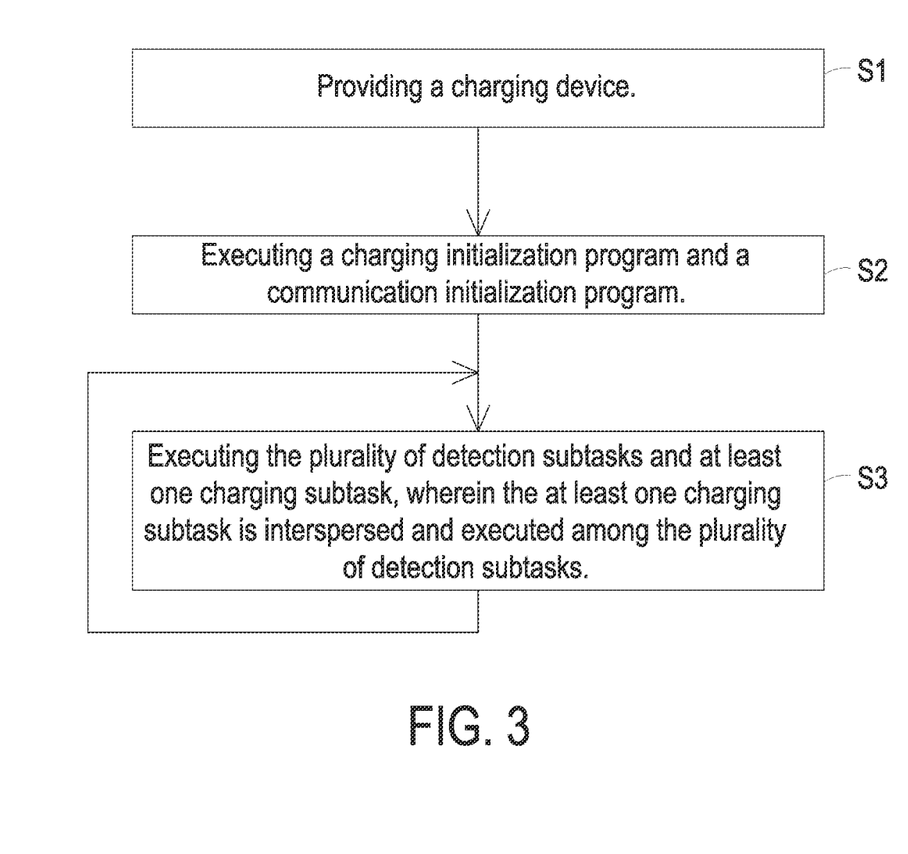
FIG. 3 is a flow chart illustrating a wireless charging method according to an embodiment of the present disclosure.

Referring to FIG. 3. FIG. 3 is a flow chart illustrating a wireless charging method according to an embodiment of the present disclosure. The wireless charging method of the present disclosure is applicable for the wireless charging system 1 stated above. As shown in FIG. 3, the wireless charging method includes steps S1, S2 and S3. In step S1, providing a charging device 10. Wherein, the charging device 10 includes at least one charging region 11 for a smart device 2 to be placed thereon. The charging device 10 is configured to charge the smart device 2 when executing a charging task, the charging task includes at least one charging subtask, and the charging device 10 is configured to detect whether there is a detection object 3 on the charging region 11 when executing a detection task, and the detection task includes a plurality of detection subtasks. In step S2, executing a charging initialization program and a communication initialization program. In step S3, executing the plurality of detection subtasks and at least one charging subtask, wherein the at least one charging subtask is interspersed and executed among the plurality of detection subtasks. Step S3 is performed again after performing step S3. The charging subtask has a charging detection cycle, and the time to execute one detection subtask is a subtask time, and the subtask time is set to be less than the charging detection cycle.

Figure 4:
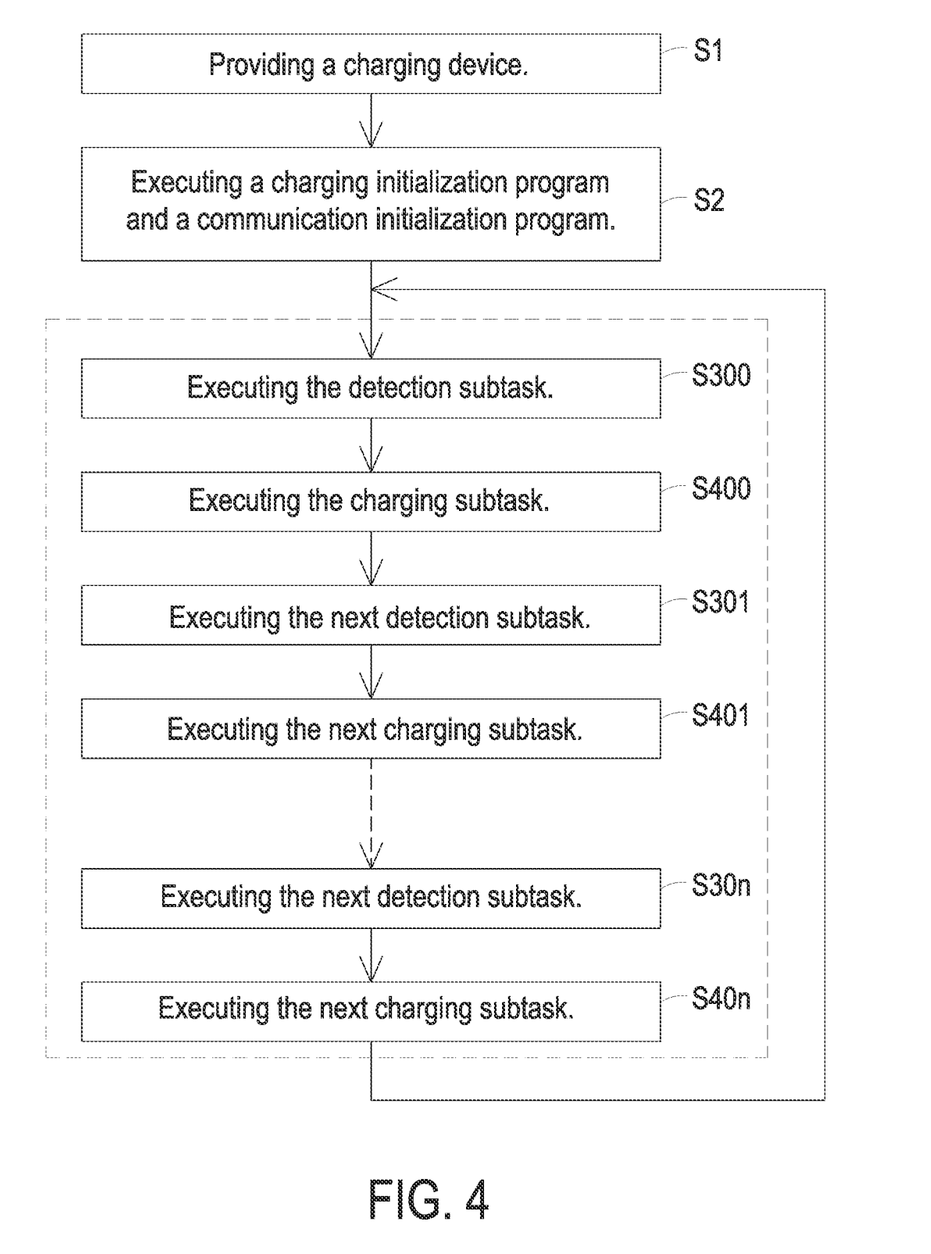
FIG. 4 is a flow chart illustrating a wireless charging method according to another embodiment of the present disclosure.

In some embodiment, as shown in FIG. 4, step S3 includes sub steps. For example, in step S300, executing the detection subtask. In step S400, executing the charging subtask. In step S301, executing the next detection subtask. In step S401, executing the next charging subtask. In step S30n, executing the detection subtask. In step S40n, executing the charging subtask. In the embodiment, for example, the steps S300~S30n are a complete detection task, and the steps S400~40n are a complete charging task. The steps in the FIG. 4 are only examples, and the steps of a specific detection task or charging task are not limited to this. In the entire wireless charging process, step S3 is repeatedly executed for multiple times, wherein the charging subtask is interspersed and executed in the plurality of detection subtasks.

In an embodiment, in step S3, the charging subtask is executed through interrupting the detection subtask. The interrupting time is set to be less than the charging detection cycle. The charging device 10 executes the detection task, when the interruption occurs, the charging device 10 suspends the execution of the detection task and executes the charging subtask. In an embodiment, in step S3, the charging subtask is executed in priority, for example, the operating system assigns the control right to the charging task so that the charging subtask is executed firstly. After the charging subtask is completed, the operating system automatically releases the control right of the CPU to the detection task. The execution of the detection task has a counting time, and the detection subtask is executed before the counting time reaches the charging detection cycle. When the counting time reaches the charging detection cycle, the operating system again assigns the control right of the CPU to the charging task to ensure the continuation of the charging task. In an embodiment, the execution time of the detection task is determined by the time when the charging task releases the control right, and the operating system assigns the use of the CPU. For example, the operating system prioritizes the control right of the CPU to the charging task, that is, the priority execution of the charging subtask. After the charging subtask is completed, the operating system releases the control right to the detection task. Meanwhile, the execution time of the detection task is determined by the time when the charging task releases the control right, that is, when the charging task needs to be executed, the operating system will immediately switch the control right of the CPU to the charging task in time.

Figure 5:
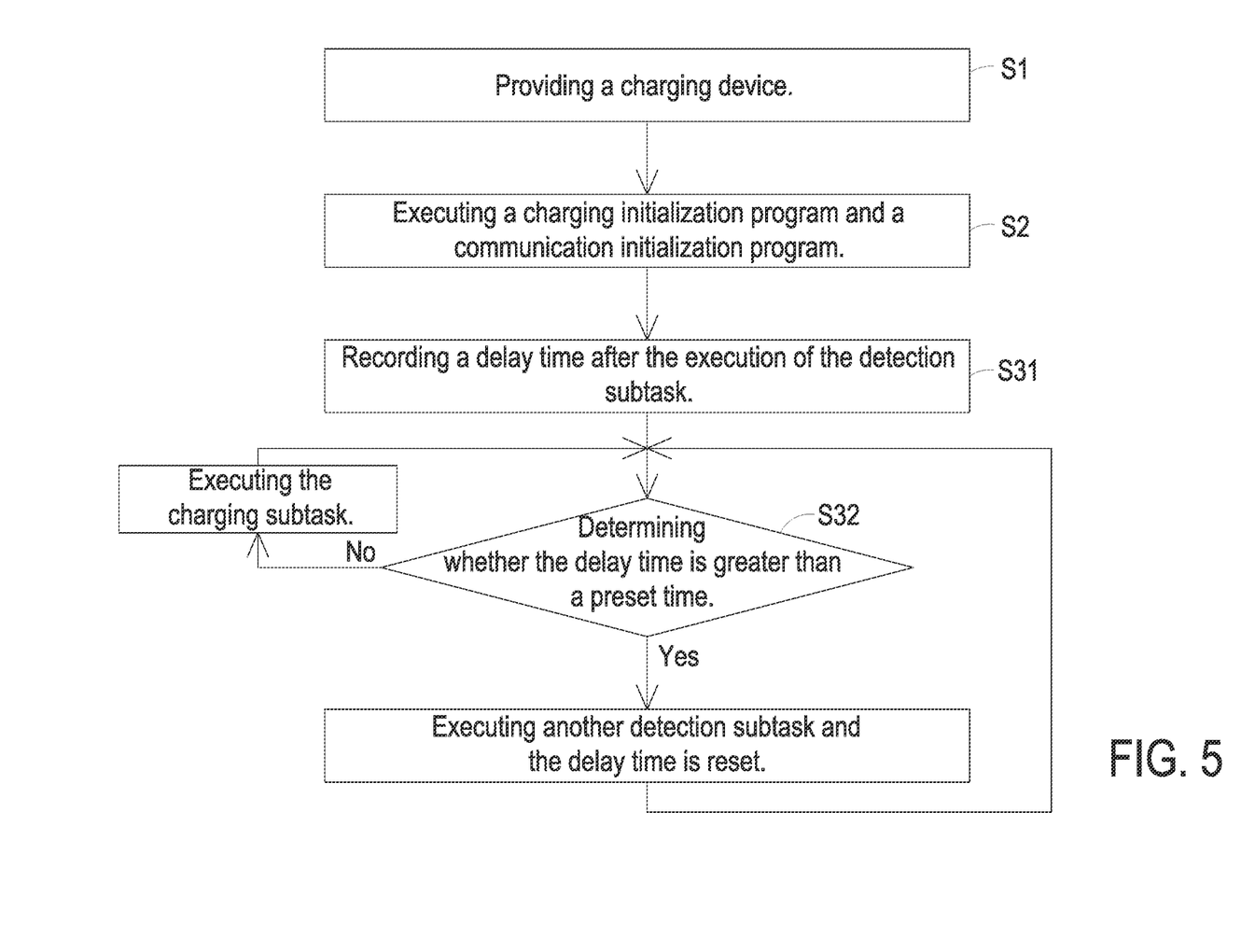
FIG. 5 is a flow chart illustrating a wireless charging method according to another embodiment of the present disclosure.

In an embodiment, as shown in FIG. 5, step S3 includes steps S31 and S32. In step S31, recording a delay time after the execution of the detection subtask. In step S32, whether the delay time is greater than a preset time is determined. Another detection subtask is executed and the delay time is reset if the determination result of step S32 is satisfied. The charging subtask is executed and step S32 is performed again if the determination result of step S32 is not satisfied. In an embodiment, for example, when the charging device 10 detects whether there is a detection object 3, the charging device 10 needs to transmit a signal to the detection object 3, and the charging device 10 needs to wait for the response of the detection object 3. The waiting process generally takes 2 to 3 seconds, so during the waiting process, the charging subtask can be executed. The execution process time of the charging subtask is generally short. After each execution, it is judged whether the waiting time reaches the preset time. If the preset time is not reached, the charging subtask is executed continuously. If the preset time is reached, the detection subtask is executed.

Figure 6:
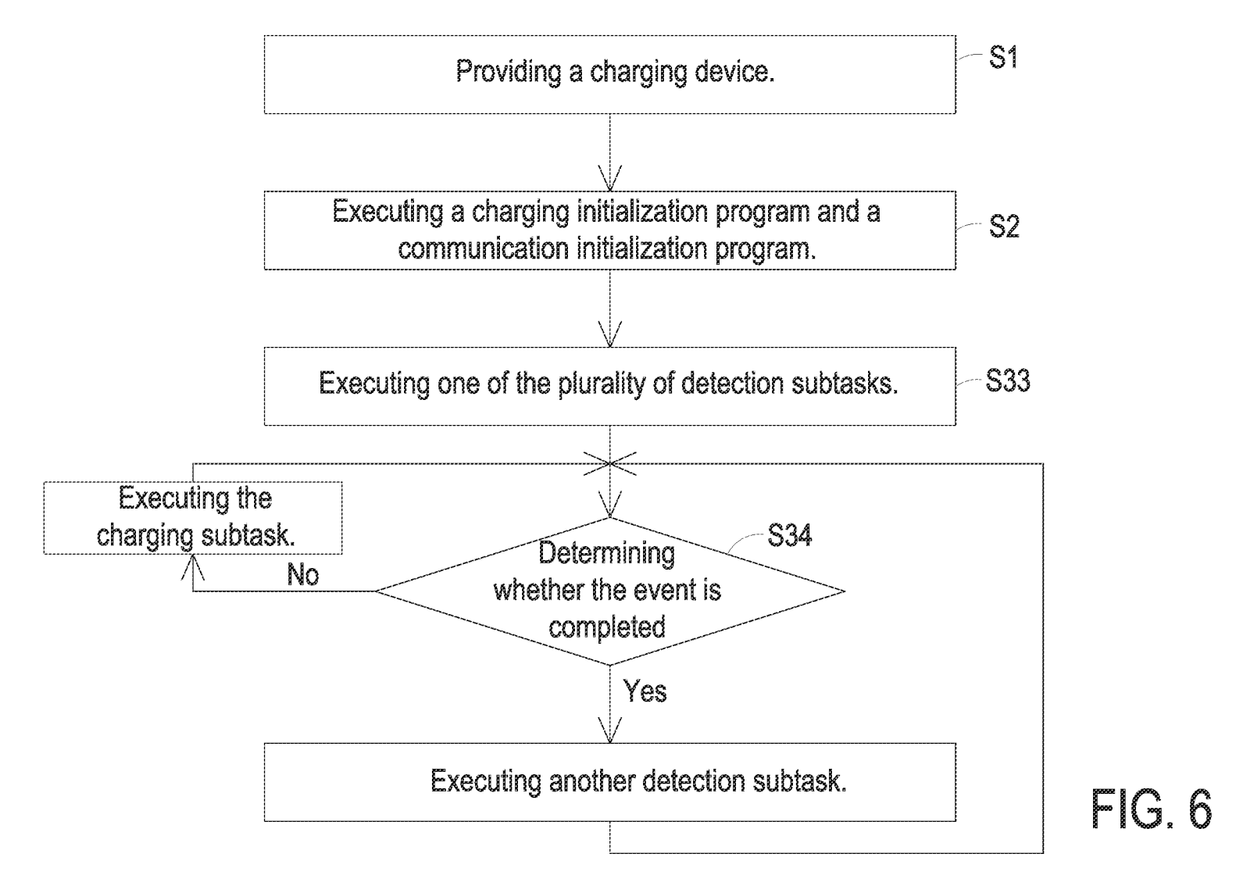
FIG. 6 is a flow chart illustrating a wireless charging method according to another embodiment of the present disclosure.

In an embodiment, as shown in FIG. 6, step S3 includes steps S33 and S34. In step S33, executing one of the plurality of detection subtasks. In step S34, whether an event is completed is determined. Another detection subtask is executed if the determination result is satisfied. The charging subtask is executed and step S34 is performed again if the determination result is not satisfied. In the embodiment, the completion of the event execution is for example but not limited to the completion of the execution of the detection task or the detection subtask. It is noted that the present disclosure does not limit the sign of the event execution completion. For example, in an embodiment, the successful communication between the charging device 10 and the detection object 3 can be used as a sign of the completion of the event execution. Therefore, in an embodiment, the charging subtask can be executed before the event occurs, and the next detection subtask is executed when the event occurs.

Figure 7:
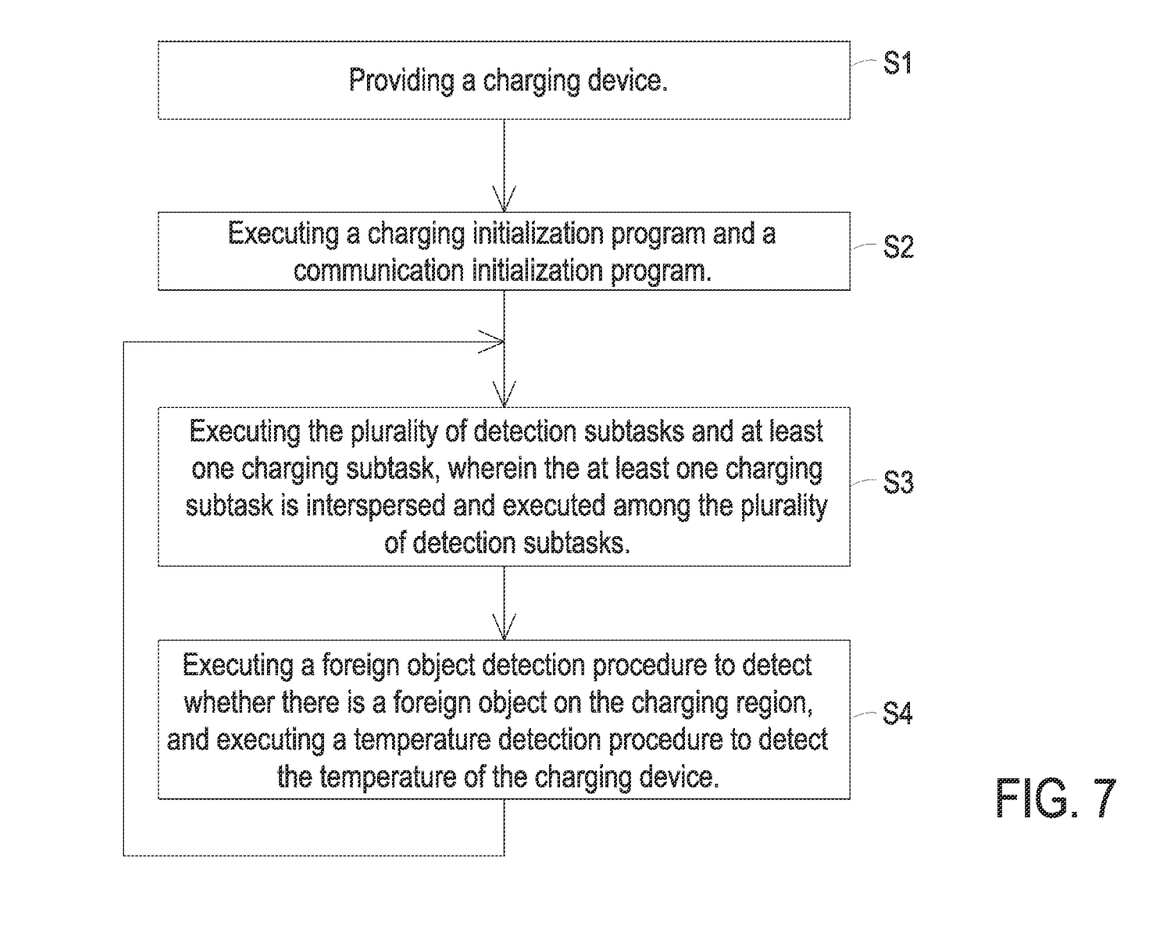
FIG. 7 is a flow chart illustrating a wireless charging method according to another embodiment of the present disclosure.

In an embodiment, as shown in FIG. 7, the wireless charging method further includes step S4. In step S4, executing a foreign object detection procedure to detect whether there is a foreign object on the charging region 11, and executing a temperature detection procedure to detect the temperature of the charging device 10. Step S3 is performed again after step S4 is performed. Wherein, the foreign object detection procedure and the temperature detection procedure have a plurality of foreign object detection subtasks and a plurality of temperature detection subtasks, respectively, and the charging subtask is interspersed and executed among the plurality of foreign object detection subtasks and the plurality of temperature detection subtasks.

Wherein, the wireless charging device 10 of the present disclosure is not limited in one way to implement the charging tasks interspersed among multiple detection subtasks. For example, in an embodiment, some charging subtasks are implemented through interruption, and some charging subtasks are implemented through event execution, and the present disclosure is not limited thereto.

From the above descriptions, the present disclosure provides a wireless charging method and device, by dividing the detection task into plurality of detection subtasks and interspersing the charging subtask into the plurality of detection subtasks, the wireless charging and the wireless detection are realized simultaneously. Therefore, the situation that the time taken to execute the complete wireless detection exceeds the cycle time of the charging safety confirmation, which causes the wireless charging device to restart constantly and incapable of executing wireless charging continuously, is avoided. Moreover, because the detection task is executed in real time completely, the detection object is prevented from being damaged.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless charging method, comprising:
   (a) providing a charging device, wherein the charging device has at least one charging region for a smart device to be placed thereon, the charging device is configured to charge a smart device when executing a charging task, the charging task comprises at least one charging subtask, and the charging device is configured to detect whether there is a detection object on the charging region when executing a detection task, and the detection task comprises a plurality of detection subtasks;
   (b) executing a charging initialization program and a communication initialization program; and
   (c) executing the plurality of detection subtasks and at least one charging subtask, wherein the at least one charging subtask is interspersed and executed among the plurality of detection subtasks,
   wherein the changing subtask has a charging detection cycle, the time for executing each of the plurality of detection subtasks once is a subtask time, and the subtask time is set to be less than the charging detection cycle.

2. The wireless charging method according to claim 1, comprising:
   (d) executing a foreign object detection procedure to detect whether there is a foreign object on the charging region and executing a temperature detection procedure to detect the temperature of the charging device.

3. The wireless charging method according to claim 2, wherein the foreign object detection procedure and the temperature detection procedure comprise a plurality of foreign object detection subtasks and a plurality of temperature detection subtasks respectively, and the at least one charging subtask is interspersed and executed among the plurality of foreign object detection subtasks and the plurality of temperature detection subtasks.

4. The wireless charging method according to claim 1, wherein the at least one charging subtask is interspersed and executed among the plurality of detection subtasks, the charging subtask is executed through interrupting the plurality of detection subtasks, and the interruption time is set to be less than the charging detection cycle.

5. The wireless charging method according to claim 1, wherein the step (c) further comprises steps of:
   (c1) recording a delay time after the execution of one of the plurality of detection subtasks; and
   (c2) determining whether the delay time is greater than a preset time, wherein another one of the plurality of detection subtasks is executed and the delay time is reset if the determination result is satisfied, the charging subtask is executed and the step (c2) is performed again if the determination result is not satisfied.

6. The wireless charging method according to claim 1, wherein the step (c) further comprises steps of:
   (c1) executing one of the plurality of detection subtasks; and
   (c2) determining whether an event is completed, wherein another one of the plurality of detection subtasks is executed if the determination result is satisfied, the charging subtask is executed and the step (c2) is performed again if the determination result is not satisfied.

7. The wireless charging method according to claim 1, wherein the priority of the charging task is set to be higher than the detection task; in the step (c), the charging subtask is executed in priority, and a counting time is set after the charging subtask is completed, and one of the plurality of detection subtasks is executed before the counting time reaches the charging detection cycle.

8. The wireless charging method according to claim 1, wherein the charging subtask comprises at least one of a communication protocol task, a charging power calibration task and a charging power output task.

9. The wireless charging method according to claim 1, wherein the detection task further comprises communication and transmission between the charging device and the detection object.

10. The wireless charging method according to claim 1, wherein the wireless charging system needs to satisfy the Qi wireless charging protocol.

11. A wireless charging system, comprising
a charging device, wherein the charging device has at least one charging region for a smart device to be placed thereon,
wherein the charging device is configured to charge the smart device when executing a charging task, the charging task comprises at least one charging subtask, and the charging device is configured to detect whether there is a detection object on the charging region when executing a detection task, the detection task comprises a plurality of detection subtasks, and the at least one charging subtask is interspersed and executed among the plurality of detection subtasks,
wherein the charging subtask has a charging detection cycle, the time for executing each of the plurality of detection subtasks once is a subtask time, and the subtask time is set to be less than the charging detection cycle.

12. The wireless charging system according to claim 11, wherein the charging device is configured to detect whether there is a foreign object on the charging region when executing a foreign object detection procedure, and the charging device is configured to detect the temperature of the charging device when executing a temperature detection procedure.

13. The wireless charging system according to claim 12, wherein the foreign object detection procedure and the temperature detection procedure comprise a plurality of foreign object detection subtasks and a plurality of temperature detection subtasks respectively, and the at least one charging subtask is interspersed and executed among the plurality of foreign object detection subtasks and the plurality of temperature detection subtasks.

14. The wireless charging system according to claim 11, wherein the at least one charging subtask is interspersed and executed among the plurality of detection subtasks, and the charging subtask is executed through interrupting the plurality of detection subtasks, the interruption time is set to be less than the charging detection cycle, the charging device executes one of the plurality of detection subtasks first and then executes the charging subtask.

15. The wireless charging system according to claim 11, wherein the priority of executing the charging task is set to be higher than the detection task, the charging device executes the charging subtask in priority, there is a counting time after the charging subtask is completed, and one of the plurality of detection subtasks is executed before the counting time reaches the charging detection cycle.

16. The wireless charging system according to claim 11, wherein the charging subtask comprises at least one of a communication protocol task, a charging power calibration task and a charging power output task.

17. The wireless charging system according to claim 11, wherein the detection task further comprises communication and transmission between the charging device and the detection object.

18. The wireless charging system according to claim 11, wherein the wireless charging system needs to satisfy the Qi wireless charging protocol.

\* \* \* \* \*